US012671203B2

(12) United States Patent
Tsau

(10) Patent No.: US 12,671,203 B2
(45) Date of Patent: Jun. 30, 2026

(54) ELECTRICAL CONNECTOR ASSEMBLY

(71) Applicant: EZCONN CORPORATION, New Taipei City (TW)

(72) Inventor: Chang-Jie Tsau, New Taipei City (TW)

(73) Assignee: EZCONN CORPORATION, New Taipei City (TW)

( * ) Notice: Subject to any disclaimer, the term of this patent is extended or adjusted under 35 U.S.C. 154(b) by 342 days.

(21) Appl. No.: 18/237,410

(22) Filed: Aug. 24, 2023

(65) Prior Publication Data

US 2024/0072480 A1 Feb. 29, 2024

Related U.S. Application Data

(60) Provisional application No. 63/373,339, filed on Aug. 24, 2022.

(51) Int. Cl.
*H01R 13/424* (2006.01)

(52) U.S. Cl.
CPC .................................. *H01R 13/424* (2013.01)

(58) Field of Classification Search
CPC .................................................... H01R 13/424
USPC ....................................................... 439/733.1
See application file for complete search history.

(56) References Cited

U.S. PATENT DOCUMENTS 3,305,626 A * 2/1967 Mohr ....................... H01R 9/20 29/451
4,362,350 A * 12/1982 von Harz ............. H01R 13/426 439/744
5,679,019 A * 10/1997 Sakai ................. H01R 13/5208 439/271
6,109,963 A * 8/2000 Follingstad .......... H01R 9/0521 439/578
7,273,395 B2 * 9/2007 Hayashi ............... H01R 13/506 439/587
7,465,198 B2 * 12/2008 Su ......................... H01R 13/111 439/733.1
7,871,295 B2 * 1/2011 Zhang .................. H01R 13/502 439/578
8,287,315 B2 * 10/2012 Montena .................. H01R 9/05 439/669
9,484,667 B2 * 11/2016 Ichio .................... H01R 13/506
9,774,138 B1 * 9/2017 Peng ....................... H01R 24/20
9,819,112 B2 * 11/2017 Koester ................ H01R 13/424
10,389,061 B2 * 8/2019 McDowell ......... H01R 13/4367
10,985,497 B1 * 4/2021 Peng ......................... H01R 4/48
11,251,563 B1 * 2/2022 Whitley ............... H01R 13/405

(Continued)

*Primary Examiner* — Harshad C Patel
(74) *Attorney, Agent, or Firm* — Min-Lee Teng

(57) ABSTRACT

An electrical connector assembly comprising an electrical connector pin and an insulator. The electrical connector pin comprises a main body and a groove, wherein the groove is located within the main body. The insulator comprises a central hole, wherein the groove passes through the insulator, and the insulator further comprises a first side and a second side, wherein the first side corresponds to the second side, and the first and second sides are partially adjacent to the main body. Wherein, in a radial direction, the diameter of the groove is equal to the diameter of the central hole. Upon installing the insulator onto the electrical connector pin, the insulator does not expand outwardly or deform, facilitating the arrangement and configuration of external structures.

7 Claims, 7 Drawing Sheets

(56) References Cited

U.S. PATENT DOCUMENTS

| | | | | |
|---|---|---|---|---|
| 11,336,047 | B2 * | 5/2022 | Kliever | H01R 13/111 |
| 12,278,446 | B2 * | 4/2025 | Peterson | H01R 13/5205 |
| 2011/0059659 | A1 * | 3/2011 | Matsumoto | H01R 13/426<br>439/733.1 |
| 2011/0287667 | A1 * | 11/2011 | Ichio | H01R 13/5227<br>439/660 |
| 2013/0217277 | A1 * | 8/2013 | Friese | H01R 13/4367<br>439/733.1 |
| 2020/0176919 | A1 * | 6/2020 | DeWitt | H01R 13/6586 |

* cited by examiner

ELECTRICAL CONNECTOR ASSEMBLY

RELATED APPLICATIONS

This application claims priority to U.S. Provisional Patent Application No. 63/373,339, filed on Aug. 24, 2022, which is incorporated herein by reference in its entirety.

TECHNICAL FIELD

The present invention relates to an electrical connector assembly, particularly to an electrical connector assembly wherein an electrical connector pin is equipped with a groove for accommodating the installation of an insulator.

BACKGROUND

The need for interconnection between components arises across various fields, and particularly in the domain of connectors, electrical connector pins stand as a widely employed choice. In order to ensure a more stable process of electrical transmission, the connection between the electrical connector pin and the equipment it is intended to be used with must be maintained securely. The fixed structure of electrical connector pins as disclosed in the prior art is illustrated in FIGS. 1, 2, and 3.

Please refer to FIGS. 1, 2, and 3. When the electrical connector pin 1 is to be assembled onto a connector, it is necessary to first position an insulator 2. The purpose of this is to prevent unintended contact between electrical connector pins 1 that could affect signal transmission efficiency. However, in the commonly used installation techniques in the prior art, the insulator 2 is placed onto the electrical connector pin 1 through interference. Using the aforementioned method to combine the insulator 2 with the electrical connector pin 1, due to the protruding structure 3 of the electrical connector pin 1, the insulator 2 is inevitably deformed during the assembly process. In other words, the insulator 2 is compressed and expands outward, resulting in an overall increase in its dimensions. This necessitates the inclusion of additional tolerance calculations in the assembly of connectors, leading to difficulties and inconveniences in assembly and design. Furthermore, because the deformation of the insulator 2 becomes an uncontrollable factor, in connectors used for high-frequency transmission today, it is bound to impact signal transmission, causing disruptions in smooth signal delivery.

SUMMARY

Therefore, the objective of the present invention is to provide an electrical connector assembly that can alleviate at least one drawback of the prior art.

One object of the present invention is to provide an electrical connector assembly that improves at least one drawback of the prior art by designing a groove on the electrical connector pin and designing a corresponding insulator for that groove. This design reduces the impact on the arrangement of other external components during the assembly process of the electrical connector assembly.

Another object of the present invention is to provide an electrical connector assembly that mitigates the increase in overall volume of the insulator when placed onto the electrical connector pin by designing a groove on the electrical connector pin and a corresponding insulator. This design reduces the need for additional tolerance calculations in product design caused by the installation of the insulator.

To achieve the above objectives, the present invention provides an electrical connector assembly comprising an electrical connector pin and an insulator. The electrical connector pin comprises a main body and a groove, wherein the groove is located within the main body. The insulator comprises a central hole, wherein the groove passes through the insulator, and the insulator further comprises a first side and a second side, wherein the first side corresponds to the second side, and the first and second sides are partially adjacent to the main body. Wherein, in a radial direction, the diameter of the groove is equal to the diameter of the central hole.

In some embodiments of the present invention, in the radial direction, the diameter of the main body is greater than the diameter of the groove, and the diameter of the insulator is not less than the diameter of the main body.

In some embodiments of the present invention, the insulator further comprises an outer peripheral surface and an inner peripheral surface, wherein the outer peripheral surface corresponds to the inner peripheral surface, and the inner peripheral surface tightly adheres to the groove.

In some embodiments of the present invention, the insulator further comprises at least one opening, and the groove is formed by the at least one opening penetrating the insulator.

In some embodiments of the present invention, the insulator is made of an elastic material, and the material of the insulator is plastic.

In some embodiments of the present invention, the insulator further comprises at least one hole, and when the number of the at least one hole is greater than one, the holes are evenly distributed in the insulator.

In some embodiments of the present invention, the insulator is assembled to the electrical connector pin by applying force to the insulator through the groove, thus tightly adhering the insulator to the electrical connector pin.

In some embodiments of the present invention, the insulator is assembled to the electrical connector pin by applying force to the inner peripheral surface through the groove, thus tightly adhering the insulator to the electrical connector pin.

In some embodiments of the present invention, wherein, in the radial direction, the diameter of the insulator remains unchanged before and after the insulator is assembled to the electrical connector pin.

In some embodiments of the present invention, it further comprises a package, wherein the electrical connector pin and the insulator pass through the package, and the insulator is adhered to the package, and the material of the package is metal.

In summary, the present invention proposes an electrical connector assembly and achieves a secure fit of the insulator onto the electrical connector pin through the groove design on the electrical connector pin. Additionally, due to the material and external design of the insulator itself, when the insulator is affixed to the electrical connector pin, its overall volume remains unchanged. In other words, installing the insulator onto the electrical connector pin does not impact the design and installation of external components.

The above and other components, steps, features, advantages, and benefits of the present invention will become clear through the detailed description of exemplary embodiments, accompanying drawings, and the claims of the application.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of coaxial cable connector incorporating aspects of the presently disclosed principles are illustrated by way of example, and not by way of limitation.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Figure 1:
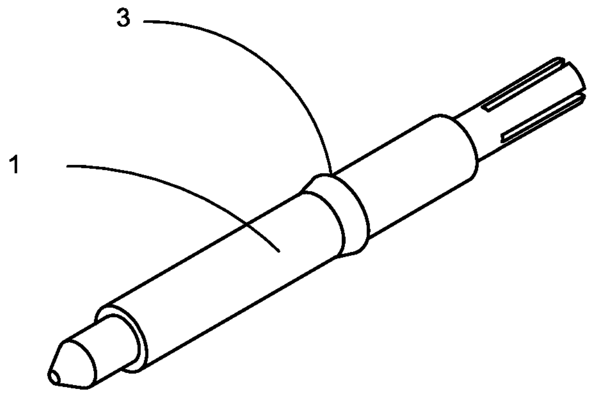
FIG. 1 is a schematic diagram of an electrical connector pin in the prior art.
Figure 2:
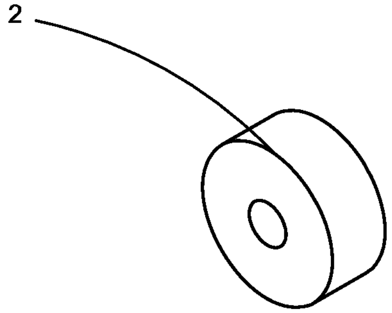
FIG. 2 is a schematic diagram of an insulator in the prior art.
Figure 3:
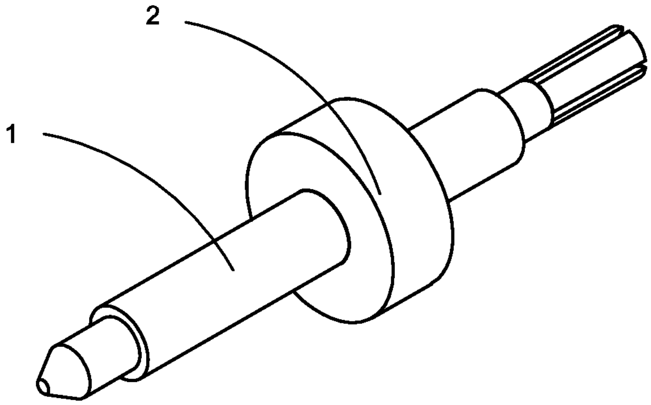
FIG. 3 is a schematic diagram of an insulator assembled onto an electrical connector pin in the prior art.
Figure 4:
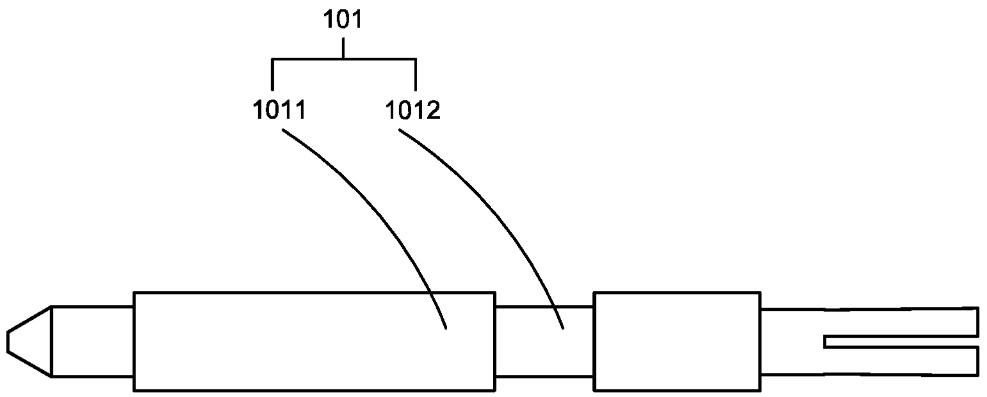
FIG. 4 is a cross-sectional schematic diagram of an exemplary embodiment of the electrical connector pin in the present invention.
Figure 5:
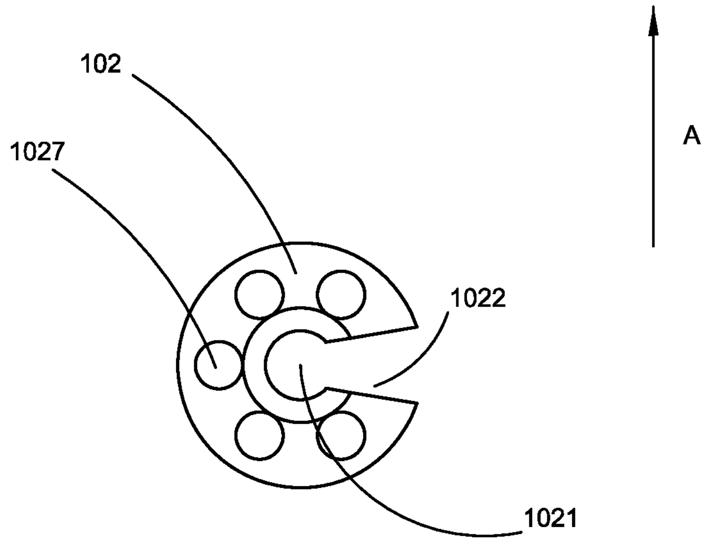
FIG. 5 is a cross-sectional schematic diagram of an exemplary embodiment of the insulator in the present invention.
Figure 6:
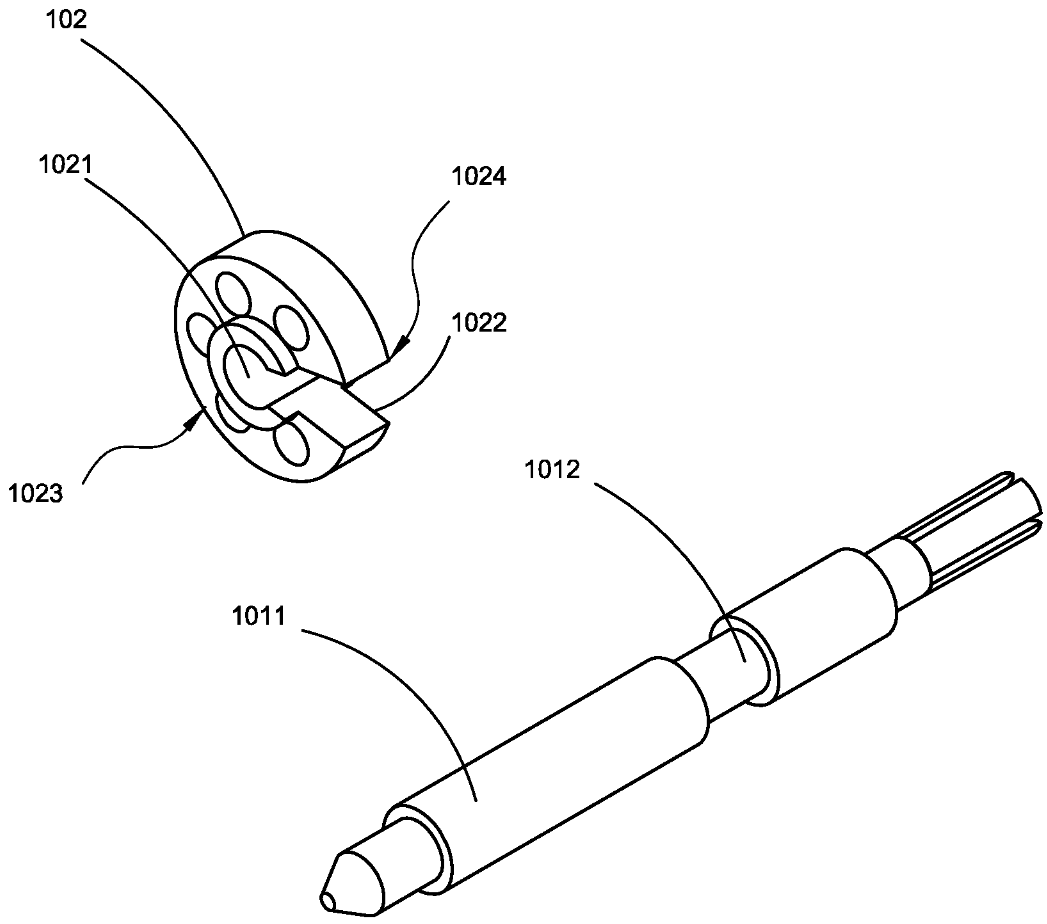
FIG. 6 is a three-dimensional schematic diagram of an exemplary embodiment in the present invention, showing the assembly of the insulator onto the electrical connector pin.
Figure 7:
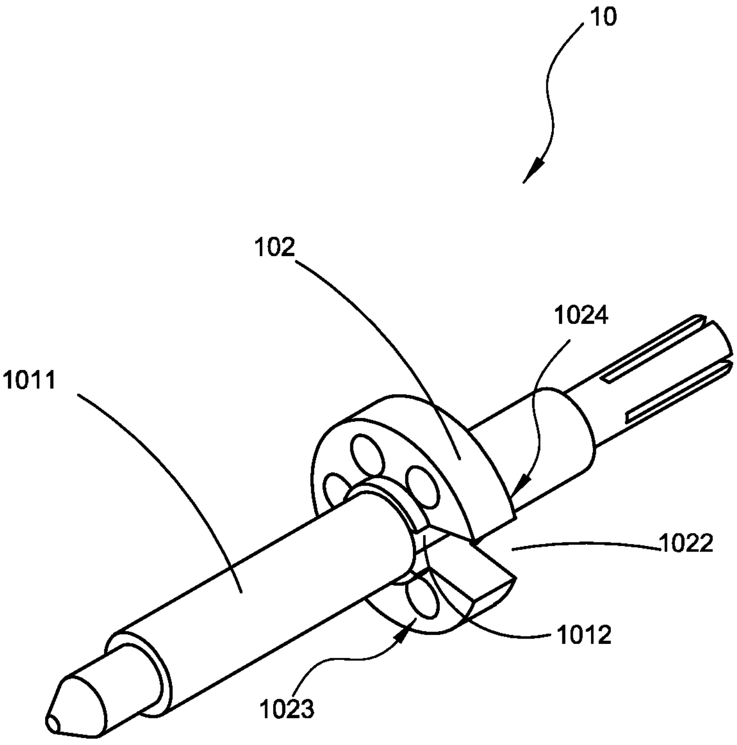
FIG. 7 is a three-dimensional schematic diagram of an exemplary embodiment in the present invention, showing the assembly of the insulator onto the electrical connector pin.

Firstly, the fundamental structure of the electrical connector assembly 10 in the present invention will be described. The electrical connector assembly 10 includes an electrical connector pin 101 and an insulator 102. Please refer to FIG. 4, which depicts a cross-sectional schematic diagram of an exemplary embodiment of the electrical connector pin 101 in this invention. The electrical connector pin 101 comprises a main body 1011 and a groove 1012. The groove 1012 is located within a segment of the main body 1011. For example, it can be situated at the front, middle, or rear section of the main body 1011, depending on the actual situation. Next, please refer to FIG. 5, which illustrates a cross-sectional schematic diagram of an exemplary embodiment of the insulator 102 in this invention. The insulator 102 comprises a central hole 1021. In this embodiment, the insulator 102 is equipped with an opening 1022. The insulator 102 is made of an elastic material, and the material is plastic. Wherein, in a radial direction A, the diameter of the main body 1011 is greater than the diameter of the groove 1012, and the diameter of the insulator 102 is not less than the diameter of the main body 1011. And, please refer to both FIG. 6 and FIG. 7. FIG. 6 presents a three-dimensional schematic diagram of an exemplary embodiment where the insulator 102 is assembled onto the electrical connector pin 101. FIG. 7 shows a three-dimensional schematic diagram of an exemplary embodiment where the insulator 102 is assembled onto the electrical connector pin 101. The insulator 102 comprises a first side 1023 and a second side 1024. The first side 1023 corresponds to the second side 1024. When the insulator 102 is mounted onto the electrical connector pin 101, the groove 1012 passes through the insulator 102. Furthermore, the groove 1012 is formed by utilizing the opening 1022 to penetrate the insulator 102. Additionally, the first side 1023 and the second side 1024 of the insulator 102 are partially adjacent to the main body 1011.

Figure 8:
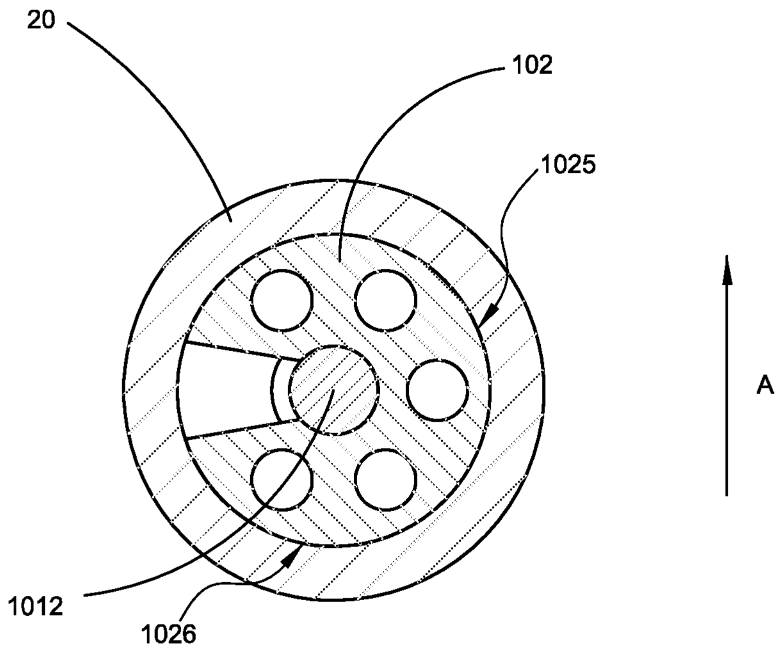
FIG. 8 is a cross-sectional schematic diagram of an exemplary embodiment in the present invention, showing the assembly of a package onto the electrical connector assembly.

Continuing to examine the structure of the electrical connector assembly 10 in more detail from the cross-sectional perspective. Please refer to FIG. 8, along with FIGS. 4 and 5. FIG. 8 illustrates a cross-sectional schematic diagram of an exemplary embodiment where the package 20 is installed onto the electrical connector assembly after its formation. In this embodiment, the electrical connector assembly is integrated into an external structure, referred to as the package 20. The electrical connector pin 101 and the insulator 102 traverse through the package 20, with the insulator 102 adhering to the package 20, and the material of the package 20 is metal. In the radial direction A, the diameter of the groove 1012 is equivalent to the diameter of the central hole 1021 in the insulator 102. It's important to note that the diagram is for illustrative purposes only and does not represent actual dimensions. The insulator 102 encompasses an outer peripheral surface 1025 and an inner peripheral surface 1026. The outer peripheral surface 1025 corresponds to the inner peripheral surface 1026, and the inner peripheral surface 1026 tightly adheres to the groove 1012.

In terms of the assembly process, when the insulator 102 is assembled onto the electrical connector pin 101, it is done by applying force through the groove 1012 onto the insulator 102, resulting in a tight adherence of the insulator 102 to the electrical connector pin 101. To be more specific, during the assembly of the insulator 102 onto the electrical connector pin 101, the insulator 102 is tightly pressed against the electrical connector pin 101 through the force exerted by the groove 1012 on the inner peripheral surface 1026. As a result, in the radial direction A, the diameter of the insulator 102 remains unchanged before and after its assembly onto the electrical connector pin 101. This is achieved solely through the intrinsic elasticity of the insulator 102, enabling the inner peripheral surface 1026 to tightly adhere to the groove 1012 of the electrical connector pin 101. The outer peripheral surface 1025 has no effect on this process. Consequently, the diameter of the insulator 102 remains constant before and after its assembly onto the electrical connector pin 101, unaffected by applied forces.

Figure 9:
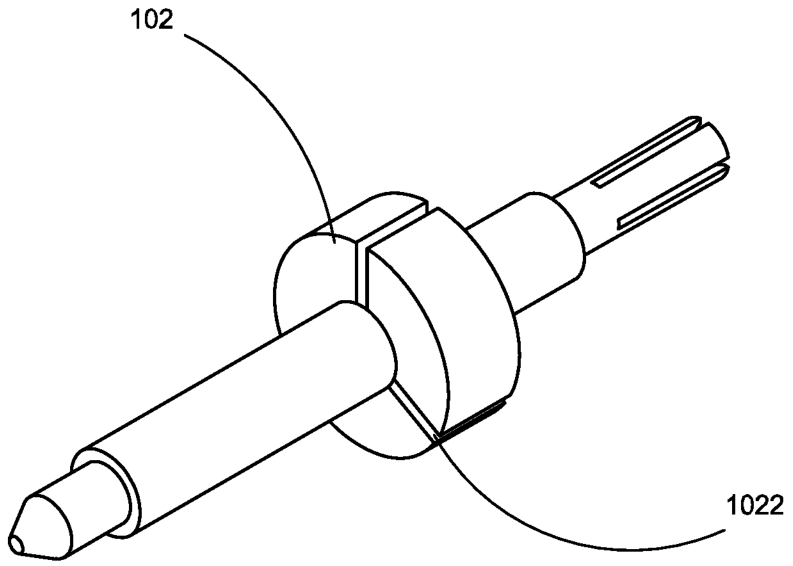
FIG. 9 is a possible pattern of the insulator in one exemplary embodiment of this invention.
Figure 10:
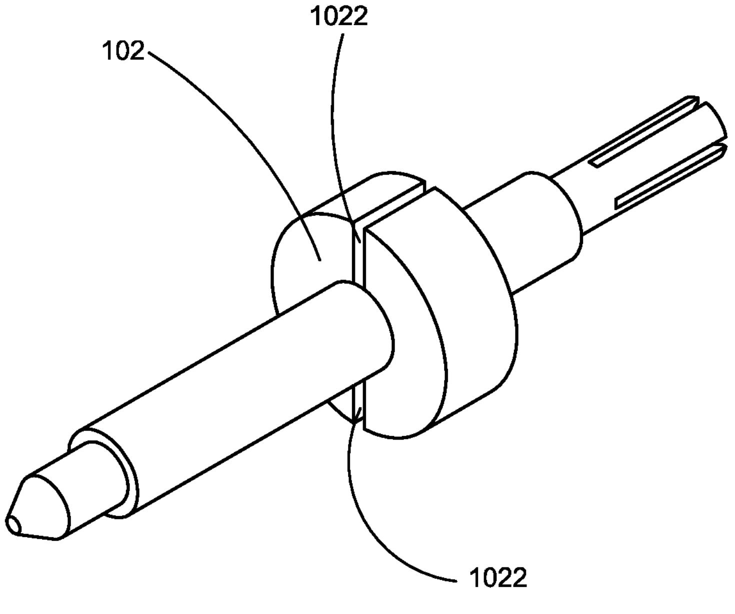
FIG. 10 is a possible pattern of the insulator in one exemplary embodiment of this invention.
Figure 11:
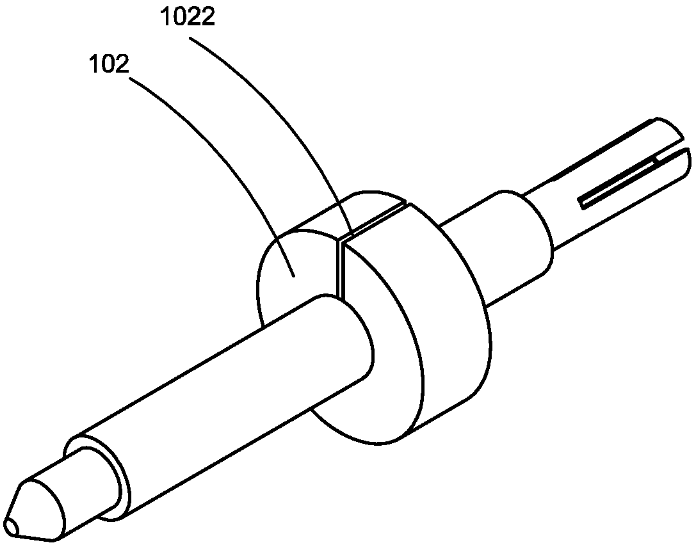
FIG. 11 is a possible pattern of the insulator in one exemplary embodiment of this invention.
Figure 12:
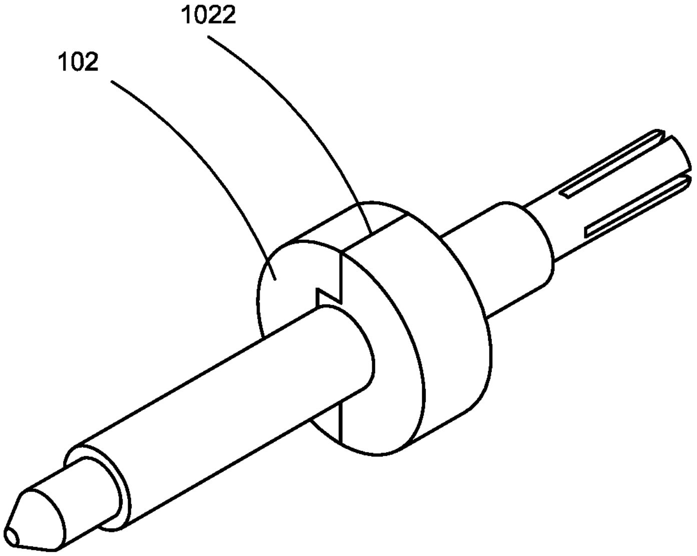
FIG. 12 is a possible pattern of the insulator in one exemplary embodiment of this invention.

Furthermore, the visual appearance of the insulator 102 can be adjusted according to practical circumstances, such as modifying the quantity or size of the openings 1022. For this aspect, please also refer to FIGS. 9, 10, 11, and 12. FIG. 9 illustrates one possible pattern of the insulator in an embodiment of the invention. FIG. 10 illustrates another possible pattern of the insulator in an embodiment of the invention. FIG. 11 illustrates yet another possible pattern of the insulator in an embodiment of the invention. FIG. 12 illustrates still another possible pattern of the insulator in an embodiment of the invention. As evident from these illustrations, the openings 1022 in the insulator 102 can be one or more, and their distribution is not restricted. Additionally, the size of the openings 1022 can also be adjusted based on actual circumstances. Whether there is one or more openings 1022, their size is not limited.

Moreover, it's important to clarify that the source of elasticity in the insulator 102 can originate from its material properties, such as using a plastic material with elasticity. However, better elasticity effects can also be achieved by incorporating holes into the insulator 102. Please refer back to FIG. 5. The insulator 102 can include at least one hole 1027, and when there are multiple holes 1027, they are evenly distributed across the insulator 102. Of course, the electrical connector assembly 10 does not require the insulator 102 to have holes 1027. This is just to illustrate that the elasticity of the insulator 102 can be enhanced by incorporating holes 1027 to absorb the generated volume resulting from applied forces. This ensures that the overall diameter of the insulator 102 remains unchanged before and after being subjected to forces.

In summary, the present invention discloses an electrical connector assembly with at least the following advantages:

First, due to the unchanging diameter of the insulator itself, there is no need for additional processing of the insulator to stabilize its dimensions, thereby reducing the occurrence of uncontrollable factors.

Second, the need for designing external limiting structures for each electrical connector assembly to counteract insulator deformation is eliminated, saving both time and money.

Third, due to the consistent dimensions of each electrical connector assembly, it is particularly advantageous for high-frequency transmission.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. An electrical connector assembly, comprising:

an electrical connector pin, comprising a main body and a groove, wherein the groove is located within the main body; and an insulator, comprising a central hole and at least one opening, wherein the insulator is an one-piece integral body made of an elastic material, wherein the insulator further comprises a plurality of enclosed holes formed are evenly distributed in the insulator, and the enclosed holes are isolated from the central hole and the at least one opening, wherein each of the enclosed holes is completely surrounded by the material of the insulator and is not exposed to any surface, wherein the enclosed holes are configured to absorb a deformation volume generated from the elastic material for remaining an overall diameter of the insulator unchanged when a compressive force is applied;

wherein the insulator further comprises a first side and a second side, wherein the first side corresponds to the second side, and the first side and second side are partially against to the main body;

wherein, in a radial direction, the diameter of the groove is equal to the diameter of the central hole;

wherein the insulator is assembled to the electrical connector pin by applying force to the inner peripheral surface of the insulator, and wherein the insulator is compressed while an outer diameter and an overall volume of the insulator remains substantially unchanged.

2. The electrical connector assembly of claim 1, wherein, in the radial direction, the diameter of the main body is greater than the diameter of the groove, and the diameter of the insulator is not less than the diameter of the main body.

3. The electrical connector assembly of claim 1, wherein the insulator further comprises an outer peripheral surface and an inner peripheral surface, wherein the outer peripheral surface corresponds to the inner peripheral surface, and the inner peripheral surface tightly adheres to the groove.

4. The electrical connector assembly of claim 1, wherein the groove is formed by the at least one opening penetrating the insulator.

5. The electrical connector assembly of claim 1, wherein the elastic material includes plastic.

6. The electrical connector assembly of claim 1, wherein, in the radial direction, the diameter of the insulator remains unchanged before and after the insulator is assembled to the electrical connector pin.

7. The electrical connector assembly of claim 1, further comprising a package, wherein the electrical connector pin and the insulator pass through the package, and the insulator is adhered to the package, and the material of the package is metal.

* * * * *